Patented Oct. 20, 1931

1,827,991

UNITED STATES PATENT OFFICE

ALBERT LEO, OF CHICAGO, ILLINOIS

JELLY PREPARATION

No Drawing.   Application filed April 6, 1929. Serial No. 353,262.

This invention relates to a jelly preparation and more particularly to a preparation that includes in dry form all of the ingredients necessary to the making of jellies and the like.

In my copending application entitled "Jelly preparation", Serial No. 345,890, filed March 9, 1929, I have disclosed a jelly preparation including pectin, a suitable acid and the total requisite amount of sugar, all in dry form and adapted to be added in a single operation to water or unconcentrated fruit juices. Such a preparation could not heretofore be used in the making of jellies for the reason that the pectin could not be made to go into solution first and without the pectin first in solution, a clear jell would not result. However, as disclosed in that application, by first coating the acid with a moisture-proof film adapted to be disrupted upon the application of heat during the jelly making operation, the solution of the acid was retarded to such an extent that the pectin was allowed to go into solution first, thereby permitting the formation of a clear jell even in the presence of the total requisite amount of sugar and acid.

The present invention constitutes a development of that previously disclosed in my copending application referred to and has for its object to provide a jelly preparation of the type therein disclosed, wherein the retardation of the solution of the acid is effected by coating the acid particles with a moisture-proof substance of an animal origin.

Other and further important objects of this invention will become apparent from the following description and appended claims.

I now propose to coat the acid particles with a fatty or waxy substance, preferably of animal origin, such as palmitic or stearic acid, or fats or the like containing relatively large proportions of these fatty acids or similar acids of relatively high melting points. The melting point of palmitic acid is approximately 140° F. and that of stearic acid approximately 158° F. In general, any fatty acid, fatty or waxy substance, having a melting point over 100° F., and preferably over 135° F., can be used in coating the acid particles to retard their solution in the making of jellies.

Any of the usual solid acids used in the manufacture of jams and jellies, such as citric, tartaric, malic, and the like, may be coated with a fatty substance such as disclosed above by dissolving the fatty substance in an organic solvent, such as ether, alcohol, or the like, and then coating the acid particles with the solution of the fatty substance and evaporating the solvent. Ether is the preferred solvent, since it most readily dissolves stearic and palmitic acid, and like fatty substances, and is at the same time both readily evaporated or otherwise driven off from the treated acid particles.

I also preferably coat the sugar used in the making of my preparation with a film or coating of pectin, as disclosed in my copending application Serial No. 328,069. According to this process, a fairly concentrated solution of pectin containing from 3 to 5% pectin content is sprayed or atomized into a mass of well agitated sugar, preferably the usual granulated variety. This can be accomplished by blowing a current of heated air upwardly through the mass of sugar crystals with sufficient force to thoroughly agitate the entire mass and cause a constant suspension of a part of the sugar crystals in the ascending air current. At the same time, the pectin solution is sprayed against the air suspended sugar crystals forming individual coatings of pectin upon them. The coating of the sugar is, however, not absolutely necessary in my present invention, since the main factor in obtaining a clear solution using a jelly preparation of this type is the retardation of the solution of the acid.

The following example will serve to illustrate my method of coating the acid particles or crystals.

Three parts of stearic acid are dissolved in 100 parts of ether and to this are added 100 parts of powdered citric acid. The ether is then removed by evaporation, leaving the stearic acid as a thin coating upon the acid crystals. Obviously, since stearic acid is not soluble in water, the citric acid will not dissolve until the stearic acid film is broken.

The stearic acid coated citric acid is then combined with the pectin coated sugar in dry form to produce a dry, powdered product with the ingredients in the requisite proportions for the making of jellies.

In using my dry jelly preparation, the mixture is combined with the liquid used in making the jelly, which may be either unconcentrated fruit juices or water, in a cold state, that is, either at room temperature or a little above. The pectin being in a thin film and presenting a large surface area to the liquid, goes readily into solution and the sugar quickly follows. The liquid mixture is then heated in the usual manner and when the temperature reaches the melting point temperature for the stearic acid, approximately 158° F., the thin film of stearic acid upon the citric acid crystals melts and exposes the citric acid particles to the dissolving action of the water. The citric acid accordingly goes into solution after the pectin and most of the sugar are completely dissolved.

The heating of the jelly mixture may be continued to approximately its boiling point, 218° F., or may be heated merely to a somewhat lower temperature, depending upon the circumstances, viz., the ratio of jelly preparation to liquid and, if fruit juices are added, the sugar, pectin and acid content of the juices. No boiling may be required if the sugar content is sufficiently high at the outset to obviate concentrating.

By the term "pectin" as used in this specification and the claims, is meant a substantially pure white pectin. The pectin used in the coating of the sugar crystals is, of course, in solution form. While no definite concentration or strength of pectin is required, these characteristics must be known in order that sufficient pectin be present to jellify the sugar with which it is associated. The sugar-pectin mixture may thus be said to be standardized, rather than the pectin, as formerly.

Any of the so called edible acids occurring in solid form may be used as the active acids in the jelly making process. One of the important features of my invention is the coating of the active acid particles or crystals with a moisture-proof substance that will prevent the dissolution of the active acid at ordinary temperatures, but will, upon the application of heat, leave the active acid free to dissolve. Ordinary varieties of fatty substances having melting points over 100° F., and preferably over 135° F. that have no objectionable taste or odor, such as palmitic and stearic acid, or other fatty acids or mixtures of the same, are admirably adapted for the purpose of coating the acid particles. Obviously, other methods of coating the acid particles than that described may be employed, but it has seemed simpler merely to dissolve the fatty acid or fatty substance in a volatile solvent, such as ether, and allow the solvent to evaporate and leave the fatty substance as the coating upon the acid crystals or particles.

I am aware that numerous details of the process may be varied through a wide range without departing from the principles of this invention, and I therefore do not purpose limiting the patent granted hereon otherwise than necessitated by the prior art.

I claim as my invention:

1. A jelly preparation comprising pectin, sugar and an edible active acid in dry form and in the requisite proportions for jelly making, said acid having a coating formed over the individual particles thereof of a fatty substance having a melting point above 100° F. and below 218° F. whereby the pectin and sugar dissolve before the acid.

2. A dry powdered preparation for forming jellies and the like comprising pectin, granulated sugar and an edible acid, the sugar granules being coated with the pectin and the acid crystals being coated with stearic acid, whereby when water is added to the preparation and the preparation heated the pectin, sugar and acid will dissolve therein in the order named.

3. A jelly preparation comprising comminuted pectin, sugar, and a solid, edible acid, said acid having a moisture-proof coating of fatty nature over its individual particles said coating having a melting point below 218° F.

4. A jelly preparation comprising comminuted pectin, sugar, and an edible acid in solid form, said acid having a coating of stearic acid over its individual particles.

5. A jelly preparation comprising comminuted pectin, sugar and citric acid crystals, said acid crystals having a coating of a fatty nature said coating having a melting point below 218° F.

6. A jelly preparation comprising comminuted pectin, sugar, and tartaric acid crystals, said acid crystals having a coating of a fatty nature the melting point of which is less than 218° F.

7. A dry preparation for forming jellies and the like comprising pectin coated granulated sugar and an edible acid in which the sugar granules are individually coated with the pectin, and the acid crystals are individually coated with a water insoluble substance of a fatty nature having a melting point below 218° F.

In testimony whereof I have hereunto subscribed my name at Chicago, Cook County, Illinois.

ALBERT LEO.